United States Patent
Damlencourt et al.

(10) Patent No.: US 9,991,548 B2
(45) Date of Patent: Jun. 5, 2018

(54) BIPOLAR LI-ION BATTERY WITH IMPROVED LEAKTIGHTNESS AND ASSOCIATED METHOD OF PRODUCTION

(71) Applicant: COMMISSARIAT A L'ENERGIE ATOMIQUE ET AUX ENERGIES ALTERNATIVES, Paris (FR)

(72) Inventors: Jean-Francois Damlencourt, Laval (FR); Gilles Moreau, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 385 days.

(21) Appl. No.: 14/775,411

(22) PCT Filed: Mar. 10, 2014

(86) PCT No.: PCT/IB2014/059579
§ 371 (c)(1),
(2) Date: Sep. 11, 2015

(87) PCT Pub. No.: WO2014/141032
PCT Pub. Date: Sep. 18, 2014

(65) Prior Publication Data
US 2016/0020482 A1    Jan. 21, 2016

(30) Foreign Application Priority Data

Mar. 11, 2013 (FR) ..................... 13 52136

(51) Int. Cl.
*H01M 10/04* (2006.01)
*H01M 2/08* (2006.01)
(Continued)

(52) U.S. Cl.
CPC ......... *H01M 10/0418* (2013.01); *H01M 2/08* (2013.01); *H01M 4/485* (2013.01);
(Continued)

(58) Field of Classification Search
None
See application file for complete search history.

(56) References Cited

U.S. PATENT DOCUMENTS 7,097,937 B2    8/2006    Fredriksson et al.
7,163,765 B2    1/2007    Hosaka et al.
(Continued)

FOREIGN PATENT DOCUMENTS

EP         2073300         6/2009
WO    WO2003/047021    6/2003
(Continued)

*Primary Examiner* — Jeremiah R Smith (57) ABSTRACT

The present invention relates to a bipolar battery with at least two electrochemical cells stacked one above the other, each collector comprising at its periphery at least one bead of an electrical insulating material also constituting a peripheral zone of the electrolyte-leaktight wall. According to the invention, each leaktight wall is constituted of at least one bead consisting of a honeycomb matrix, the matrix being covered, on each of its two main faces, with a layer or leaf made of heat-sealing and electrically insulating material, each layer or leaf being heat-sealed to one of the current collectors, the heat-sealing and electrically insulating material filling at least partly the cells of the honeycomb while interconnecting the two layers or leafs.

14 Claims, 3 Drawing Sheets

(51) Int. Cl.

| | |
|---|---|
| *H01M 4/485* | (2010.01) |
| *H01M 4/58* | (2010.01) |
| *H01M 4/66* | (2006.01) |
| *H01M 10/0525* | (2010.01) |
| *H01M 10/0585* | (2010.01) |
| *H01M 4/80* | (2006.01) |

(52) U.S. Cl.
CPC ......... *H01M 4/5825* (2013.01); *H01M 4/661* (2013.01); *H01M 4/80* (2013.01); *H01M 10/044* (2013.01); *H01M 10/0525* (2013.01); *H01M 10/0585* (2013.01)

(56) References Cited

U.S. PATENT DOCUMENTS

| | | |
|---|---|---|
| 7,220,516 B2 | 5/2007 | Oosawa et al. |
| 7,279,248 B2 | 10/2007 | Fukuzawa et al. |
| 7,320,846 B2 | 1/2008 | Watanabe et al. |
| 7,335,448 B2 | 2/2008 | Kaito et al. |
| 7,338,733 B2 | 3/2008 | Morita et al. |
| 7,348,098 B2 | 3/2008 | Hayashi et al. |
| 2006/0121348 A1 | 6/2006 | Mizutani et al. |
| 2008/0057392 A1 | 3/2008 | Takamatsu et al. |
| 2008/0060189 A1 | 3/2008 | Daidoji et al. |

FOREIGN PATENT DOCUMENTS

| | | |
|---|---|---|
| WO | WO2006/061696 | 6/2006 |
| WO | WO2011/157751 | 12/2011 |

BIPOLAR LI-ION BATTERY WITH IMPROVED LEAKTIGHTNESS AND ASSOCIATED METHOD OF PRODUCTION

CROSS-REFERENCE TO RELATED APPLICATIONS

This application is a national phase application under 35 U.S.C. § 371 of International Application No. PCT/IB2014/059579 filed 10 Mar. 2014, which claims priority to French Patent Application No. 13 52136 filed 11 Mar. 2013. The entire contents of each of the above-referenced disclosures is specifically incorporated herein by reference without disclaimer.

TECHNICAL FIELD

The present invention relates to the field of lithium electrochemical generators, which operate on the principle of insertion or disinsertion, otherwise known as intercalation-deintercalation, of lithium in at least one electrode.

It relates more particularly to a lithium electrochemical accumulator comprising at least one bipolar current collector, also called a bipolar battery. In such a bipolar battery, the bipolar collector, also called a bipolar electrode, supports on each of the opposing faces thereof one of the two electrode materials opposite in sign, i.e. with a cathode (positive electrode) supported by the one of the faces and an anode (negative electrode) supported by the other of the opposing faces.

The invention is aimed at improving the seal of electrochemical generators with respect to the electrolyte, and in particular at improving the seal of a bipolar battery with respect to the electrolyte in liquid form.

PRIOR ART

The architecture of conventional lithium-ion batteries is an architecture that may be termed monopolar, since it is based on a single electrochemical cell comprising an anode, a cathode and an electrolyte. Several types of monopolar architectural geometry are known:

a cylindrical geometry as disclosed in patent application US 2006/0121348, a prismatic geometry as disclosed in U.S. Pat. Nos. 7,348,098 and 7,338,733;

a stacking geometry as disclosed in patent applications US 2008/060189, US 2008/0057392 and U.S. Pat. No. 7,335,448.

A monopolar architecture is produced by winding. The winding consists of a current collector on which a positive electrode material (cathode) is continuously deposited, a separator made of polymer or ceramic material being intercalated with a negative electrode material (anode) itself deposited on another current collector. This monopolar architecture has the main advantage of having a large active surface of material but the potential difference is restricted to the unit value of the potential difference between the two electrode materials used, which is also the case of stacking geometry.

In order to increase the average potential of a monopolar Li-ion battery while preserving a comparable energy density, it is known to produce a battery with a plurality of electrochemical cells in series. The architecture of the battery is thus termed bipolar since it includes a cathode of one cell and an anode of an adjacent cell which are supported on the same current collector in the form of a plate, itself termed a bipolar electrode. The architecture of a bipolar battery thus corresponds to the series connection of multiple monopolar accumulators via bipolar electrodes or current collectors, but with the advantage of having a low electrical resistance compared with monopolar accumulators connected in series by external connectors. Numerous patent applications or patents relating to such bipolar batteries may be cited here, such as U.S. Pat. No. 7,279,248, U.S. Pat. No. 7,220,516, U.S. Pat. No. 7,320,846, U.S. Pat. No. 7,163,765, WO 03/047021, WO 2006/061696 and U.S. Pat. No. 7,097,937.

The subsequent advantages of a bipolar battery are those of having a reduced mass and not comprising unnecessary volumes.

The main difficulty in designing a bipolar battery is the production of compartments that are perfectly impermeable to the electrolyte, generally in liquid form, with respect to each other. Indeed, a poor seal causes malfunctioning of the bipolar battery via ionic short circuits.

This is further corroborated by the fact that most of the patent literature dealing with the field of bipolar Li-ion batteries concerns sealing or sealant solutions, for preventing electrolyte leakage from one compartment to the other (ionic short circuits). Whichever sealing system is adopted, it must:

be chemically resistant to the liquid electrolyte, e.g. consisting of a solution of lithium salt $LiPF_6$ in a solvent mixture of ethylene carbonate (EC), and dimethyl carbonate (DMC);

be easy to implement: indeed, during the operations of stacking the various elements forming a bipolar battery, the implementation of the seal must be able to be compatible with an industrial production line and be performed at relatively low temperatures generating little or no degradation of the electrodes, the separator or the electrolyte;

ensure a total long-term seal.

Among the patent applications or patents already mentioned above, U.S. Pat. No. 7,220,516 may be cited which describes a solution with a flexible adhesive film 5, 6, stuck onto the periphery of the bipolar collector.

U.S. Pat. No. 7,320,846 may also be cited which describes a solution of coating the collectors 4 and electrolytes 6 in a resin 10.

U.S. Pat. No. 7,163,765 may also be cited describing a sealing solution with mixed polyamide/PP sealing layers 9 arranged between bipolar collectors, the polyamide being welded directly to the periphery of the collectors away from the cells.

U.S. Pat. No. 7,097,937 provides a double sealing solution, since a fluoropolymer inner barrier 14, 22 is arranged on the periphery of the bipolar collector 11 and an elastomer outer frame 18, 23 is arranged on the outside of the barrier 14, 22 on and around the bipolar collector optionally with the arrangement of an additional elastomer ring 15 on the collector 11.

Patent application EP 2073300 on behalf of the applicant may further be cited, which provides a solution according to which the dimensions of the plates are increased one with respect to the adjacent other and the sealing joints interposed between the interconnecting plates are offset transversely so that two joints are not located opposite each other along the stacking axis of the cells.

Finally, WO 2011/157751 may be cited, which describes a solution of integrating polymer-based sealing means with a metal grate or sheet acting as a current collector.

Thus, the solutions already envisaged for improving the seal between compartments with respect to the electrolyte in a bipolar Li-ion battery may be summarized as follows:

- systematic embodiment of the bipolar current collector, also called a bipolar electrode, in the form of a plate,
- use of various glues/polymers or resins at the periphery of the plate,
- increase in the format of the bipolar current collector plate for creating an additional barrier to the electrolyte;
- integrating polymer-based sealing means with a metal grate or sheet acting as a current collector.

All these sealing solutions already considered are not completely satisfactory. Indeed they all use polymers or resins which display a robustness with respect to the electrolyte which is low during the operation of the bipolar battery and in duration. In addition, the implementation of solutions with polymers is tricky since these have a tendency to flow beyond a certain temperature, which is certainly not expected to be reached during battery operation, but may be in case of runaway. Finally, the heat sealing of a polymer in a compartment provided during the manufacture of the bipolar battery may lead to a deterioration in the seal of electrochemical compartments already sealed due to the very fact of repeated heating, which may cause unwanted flow of the polymer thereof.

The general aim of the invention is to provide a solution other than those already envisaged for improving the seal of the compartments therebetween with respect to the electrolyte, in particular of the liquid electrolyte, in a bipolar Li-ion battery, more generally in a lithium electrochemical generator.

A particular aim is to provide a solution for sealing a bipolar battery, more generally of a lithium electrochemical generator, with respect to the electrolyte, more particularly a liquid electrolyte, which is robust in operation and in duration and easy to implement, preferably at a relatively low temperature.

DISCLOSURE OF THE INVENTION

To do this, the subject matter of the invention is a Li-ion type bipolar battery, including:
- at least a first and second electrochemical cell stacked one on top of the other and each comprising an anode, a cathode and an electrolyte,
- at least one bipolar current collector, one face of which is covered by the anode made of lithium insertion material of the first cell and the opposite face is covered by the cathode made of lithium insertion material of the second cell, the bipolar collector comprising at the periphery thereof, on each of the faces thereof, at least one bead of an electrically insulating material forming a peripheral zone of a wall impermeable to the electrolyte of the first or second cells, surrounding same,
- at least one first current collector adjacent to the bipolar collector, one face of which is covered by the cathode of the first cell; the first adjacent collector also comprising at the periphery thereof at least one bead of an electrically insulating material also forming a peripheral zone of a wall impermeable to the electrolyte of the first cell,
- at least one second current collector adjacent to the bipolar collector, one face of which is covered by the anode of the second cell; the second adjacent collector also comprising at the periphery thereof at least one bead of an electrically insulating material also forming a peripheral zone of the wall impermeable to the electrolyte of the second cell.

According to the invention, each impermeable wall consists of at least one bead formed from a honeycomb matrix, the matrix being covered, on each of its two main faces, with a layer or sheet made of a heat-sealing and electrically insulating material, each layer or sheet being heat sealed to one of the current collectors, the heat-sealing and electrically insulating material at least partially filling the alveoli of the honeycomb in such a way that the two layers or sheets join together.

The honeycomb matrix is preferably based on a material that does not flow under the heat-sealing conditions. Preferably, the matrix is formed from a polymer and more preferably the honeycomb matrix comprises a material chosen from polyurethane PU and polytetrafluoroethylene PTFE. Advantageously, the honeycomb matrix is made of polyurethane or polytetrafluoroethylene.

The expression "heat-sealing material" is, here and in the context of the invention, understood to mean a material allowing the honeycomb structure to be welded to the current collector, typically made of aluminum, under the action of heat.

The sealing solution according to the invention makes it possible to reliably prevent the risk of leakage in all the compartments of a bipolar battery both from the interior to the exterior of the electrolyte and from the exterior to the interior of ambient air.

The invention improves upon prior-art resin- or polymer-based sealing solutions.

Specifically, firstly, the structure of the honeycomb matrix makes it possible to ensure initially i.e., before the heat sealing, and thereafter, that each bead, the height of which remains constant and determines the unitary height of a compartment of the battery, has a good mechanical strength. Thus, the negative consequences of the flow of prior-art resins or polymers, which result in a defective final seal and too small a final seal height, are avoided.

Next, the definitive heat sealing of the honeycomb matrix structure is carried out by heating at a relatively low temperature, typically lower than or equal to 200° C., and preferably at about 80° C., for about 10 to 100 seconds.

Once the heat sealing has been carried out for an electrochemical compartment, there is no longer any risk of modification of the impermeable wall even in the case of the other compartments of the battery getting hot or the latter getting hot, especially during the successive heating operations required to heat seal other sealing beads or when the battery is liable to function in a degraded mode (temperature above the nominal operating temperature). Thus, for a given sealing bead of a compartment of the bipolar battery, even if one portion of its honeycomb structure, i.e. some of its alveoli, collapse during the successive heating operations required to heat seal other sealing beads of other compartments of the bipolar battery, the remaining portion of the structure makes it possible to guarantee the seal is preserved.

Furthermore, because of the honeycomb matrix structures of the various sealing beads, a bipolar battery according to the invention has a certain flexibility. The PU or PTFE material of the honeycomb matrix and the heat-sealing and electrically insulating material of the chosen sheets or layers have a high chemical resistance to the electrolyte and a high resistance to operating temperatures.

'Electrode made of lithium insertion material' here and in the context of the invention is understood to mean an electrode comprising at least one lithium insertion material and at least one polymer binder. Optionally, the electrode may further comprise an electronic conductor, e.g. carbon fibers or carbon black. 'Lithium insertion material', in particular for the positive electrode, here and in the context of the invention, is understood to mean a material selected from the lithiated oxides including manganese with a spinel structure, lithiated oxides with a lamellar structure and mixtures thereof, lithiated oxides with polyanionic frameworks of the formula $LiM_y(XO_z)_n$ with M representing an element selected from Mn, Fe, Co, Ni, Cu, Mg, Zn, V, Ca, Sr, Ba, Ti, Al, Si, B and Mo, X representing an element selected from P, Si, Ge, S and As, y, z and n being positive integers.

'Lithium insertion material', in particular for the negative electrode, is also understood to mean a material selected from: lithiated or non-lithiated titanium oxide, e.g. $Li_4Ti_5O_{12}$ or $TiO_2$. More particularly, the negative electrode material may be selected from carbonaceous materials, non-lithiated titanium oxides and their derivatives and lithiated titanium oxides such as $Li_4Ti_5O_{12}$ and the derivatives thereof and a mixture of same.

'Lithiated derivative', here and in the context of the invention, is understood to mean compounds of formula $Li_{(4-x1)}M_{x1}Ti_5O_{12}$ and $Li_4Ti_{(5-y1)}N_{y1}O_{12}$ where x1 and y1 are respectively between 0 and 0.2 and M and N are respectively chemical elements selected from Na, K, Mg, Nb, Al, Ni, Co, Zr, Cr, Mn, Fe, Cu, Zn, Si and Mo.

'Non-lithiated derivative', here and in the context of the invention, is understood to mean $Ti_{(5-y1)}N_{y1}O_{12}$, with y1 between 0 and 0.2 and N is a chemical element selected from Na, K, Mg, Nb, Al, Ni, Co, Zr, Cr, Mn, Fe, Cu, Zn, Si and Mo.

'Current collector adjacent to the bipolar current collector' is understood to mean a collector that is closest to the bipolar current collector in the stack and which may be either another bipolar current collector or a terminal current collector of the stack.

Preferably, the thickness of each bead is substantially equal to the thickness of an electrochemical cell.

Again preferably, the thickness of each bead is between 100 and 200 µm, preferably equal to 150 µm plus or minus 5 µm.

Again preferably, the width of each bead is between 0.1 and 2 cm.

According to a first advantageous embodiment, some of the alveoli of the honeycomb matrix, which are closest to the electrochemical cells, being filled with salts or mucilaginous compounds apt to react with the electrolyte.

According to a second advantageous embodiment, some of the alveoli of the honeycomb matrix, which are furthest from the electrochemical cells, being filled with salts or mucilaginous compounds apt to react with moisture in the ambient air. The first and second embodiments may be combined, i.e. alveoli close to both the lithiated electrolyte and the ambient air, i.e. the exterior of the electrochemical cells C1, C2, may be filled with salts or mucilaginous compounds. Thus, according to these embodiments, during initiation of possible leakage either of ambient air toward the interior of the battery or of the electrolyte toward the exterior of the battery, the reaction of the salts or the bulking up of the mucilaginous compounds in the alveoli in question will block the route of the potential leak. In other words, seal tightness is thus guaranteed even in the case of initiation of leakage into or from the bipolar battery according to the invention.

According to one embodiment, the bipolar battery includes a stack of n electrochemical cells, with a number of n−2 bipolar current collectors, one of the adjacent collectors being a terminal current collector, the other of the adjacent collectors being the other terminal current collector.

According to one variant embodiment, all the anodes are made of $Li_4Ti_5O_{12}$ and the cathodes of $LiFePO_4$.

The subject matter of the invention, in another of the aspects thereof, is also a process for the production of a bipolar battery including at least a first and second electrochemical cell stacked one on top of the other and each comprising an anode, a cathode and an electrolyte, a/ producing a bipolar current collector with one face covered by the anode made of lithium insertion material of the first cell and the opposite face covered by the cathode made of lithium insertion material of the second cell;

b/ producing a first current collector, intended to be adjacent to the bipolar collector, one face of which is covered by the cathode of the first cell;

c/ producing a second current collector, intended to be adjacent to the bipolar collector, one face of which is covered by the anode of the second cell;

d/ producing a first bead formed from a honeycomb matrix, at least some of the alveoli of the matrix being filled with a heat-sealing and electrically insulating material that furthermore covers each of its two main faces taking the form of a layer or sheet;

e/ installing the bead on the periphery of that face of the second collector which is covered with the anode;

f/ installing a first separator on the anode of the second collector in the interior of the first bead;

g/ stacking the bipolar current collector such that the anode of the adjacent second collector is facing the cathode of the bipolar collector while being separated from the first separator, and such that the first sealing bead bears against both the second collector and the bipolar collector; and h/ heating the first bead making contact with the periphery of the collectors so as to heat seal the honeycomb matrix, steps d/ to h/ being carried out at least once with a second sealing bead, a second separator and the first current collector.

'Separator', here and in the context of the invention, is understood to mean an electrical insulator, ionic conductor formed by at least one polymer material such as polyvinylidene fluoride (PVDF), polyvinyl acetate (PVA), polymethylmethacrylate (PMMA), polyethylene oxide (PEO), polyethylene terephthalate (PET), or a polymer selected from the polyolefins such as polypropylene, polyethylene or cellulose.

The electrolyte according to the invention may be a liquid formed of a mixture of carbonate and at least one lithium salt. 'Lithium salt' is preferably understood to mean a salt selected from LiPF6, LiClO4, LiBF4 and LiAsF6.

Alternatively, the electrolyte may include one or more lithium-ion-based ionic liquids, namely a salt consisting of lithium cations, complexed with inorganic or organic anions, which has the property of being in liquid state at ambient temperature. An ionic liquid, according to the nature of the anion, may be hydrophilic or hydrophobic. Examples of ionic liquids include hydrophobic anion-based ionic liquids like trifluoromethanesulfonate ($CF_3SO_3$), bis(trifluoromethylsulfonyl)imide [$(CF_3SO_2)_2N$] and tris((trifluoromethyl)sulfonyl)methanide [$(CF_3SO_2)_3C$].

The heating in each step f/ is preferably carried out using U-shaped heating jaws placed about peripheral portions of the previously stacked collectors.

The heating in each step f/ is preferably carried out at a temperature below 200° C. and typically at about 80° C.

DETAILED DESCRIPTION

Other advantages and features will better emerge on reading the detailed description, given by way of illustration with reference to the following figures in which:

FIGS. 6A to 46J are longitudinal sectional views showing the various steps of production of a bipolar lithium battery according to the invention, and FIG. 7 is a top view of a variant embodiment of a honeycomb matrix structure of a sealing bead according to the invention.

For the sake of clarity, the same references designating the same bipolar battery elements according to the prior art and according to the invention are used for all the FIGS. 1 to 7.

Figure 1:
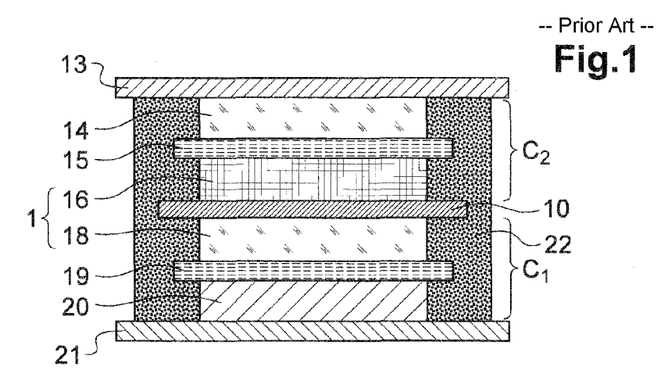
FIG. 1 is a schematic longitudinal sectional view of a bipolar lithium battery according to the prior art.
Figure 2A:
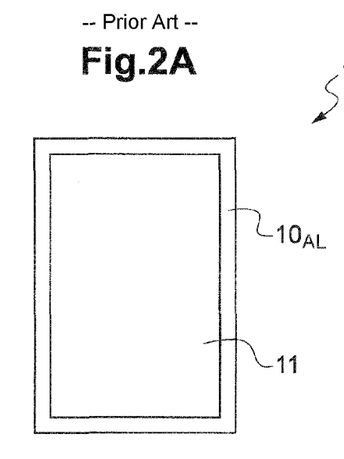
FIGS. 2A and 2B are respectively front and sectional views of a bipolar current collector used in a bipolar lithium battery according to the prior art.
Figure 2B:
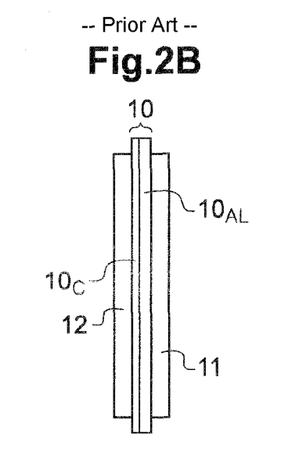

A bipolar Li-ion battery according to the prior art is represented in FIG. 1, as illustrated in patent application WO 03/047021. This battery comprises in the upper portion an aluminum conductive substrate 13 (current collector positive terminal) and an active layer 14 based on positive lithium insertion material, such as $Li_{1.04}Mn_{1.96}O_4$, and in the lower portion an aluminum conductive substrate 21 (negative terminal current collector) and an active layer 20 based on positive lithium insertion material, such as $Li_4Ti_5O_{12}$.

Within this battery, a bipolar electrode 1, also called a bipolar current collector, includes an anode layer 16 and a cathode layer 18 on each side of an aluminum conductive substrate 10 in the form of a plate. The lower 20 and upper 14 electrodes are separated from the bipolar electrode 1 by two separators 15, 19 wherein an electrolyte is present in liquid or gel form. The seal for the battery electrolytes between the two adjacent electrochemical cells formed 14, 15, 16 and 18, 19, 20 is provided by a joint 22 which is created by a resin or adhesive deposit on the periphery of all the electrodes and the plate 10.

Figure 3A:
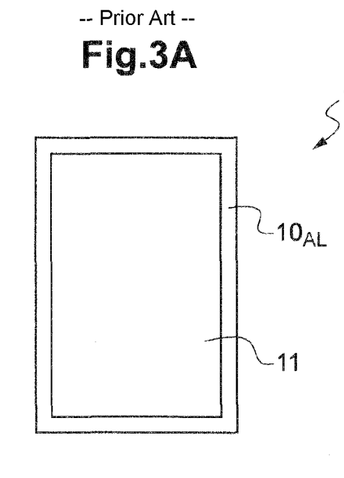
FIGS. 3A and 3B are respectively front and sectional views of another bipolar current collector used in a bipolar lithium battery according to the prior art.
Figure 3B:
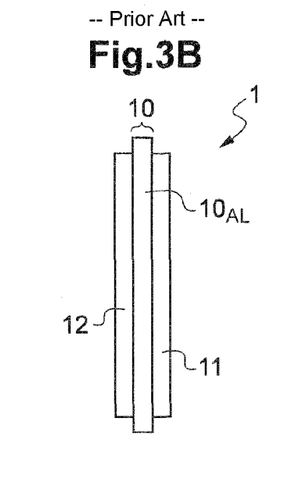

A bipolar current collector 10 according to the prior art, according to the lithium ion insertion materials used for producing the electrodes:
- either consists of two superimposed plates, of which one typically made of aluminum 10A1 is covered by a cathode 11 and the other typically made of copper 10C is covered by an anode 12 (FIGS. 2A and 2B),
- or consists of a single plate typically made of aluminum 10A1 covered on one of the faces by a cathode 11 and on the other of the faces thereof by an anode 12 (FIGS. 3A and 3B). The main difficulty encountered in the design of a bipolar battery according to the prior art is the production of compartments that are perfectly impermeable to the electrolyte, generally in liquid form, with respect to each other, such as between the two cells C1 and C2, i.e. between compartments referenced 14, 15, 16 and 18, 19, 20 in FIG. 1.

The implementation of the joints 22 or the increase in the plates 10 of the bipolar electrode according to the prior art for achieving this are not fully satisfactory.

Consequently, the inventors provide a new solution for sealing a bipolar Li-ion battery with respect to the electrolyte, more particularly a liquid electrolyte, which is robust in operation and in duration and easy to implement, preferably at relatively low temperature.

The inventors thought to produce each impermeable wall with a bead the matrix structure of which is made up of a honeycomb based on polyurethane (PU) or polytetrafluoroethylene (PTFE), the two main faces of the matrix each being covered with a layer or sheet made of a material that not only is electrically insulating but that also heat seals to the material from which the current collectors are made. To ensure complete seal tightness over the height of the honeycomb, the heat-sealing material at least partially fills the alveoli of the honeycomb in such a way that the two opposing layers or sheets join together.

FIGS. 4, 4A, 5 and 5A show the production of sealing beads 23 according to the invention.

Figure 4:
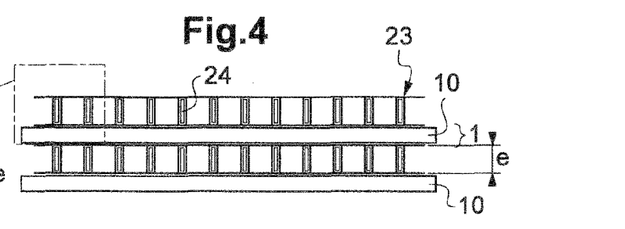
FIG. 4 is a schematic side view of a bipolar lithium battery according to the invention, the side view allowing impermeable walls produced according to the invention to be seen.
Figure 4A:
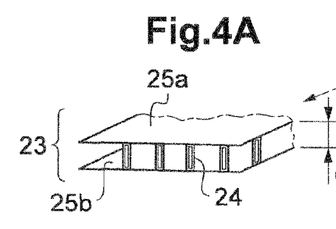
FIG. 4A is a view of a detail of FIG. 4 allowing a sealing bead according to one embodiment of the invention to be seen.
Figure 5:
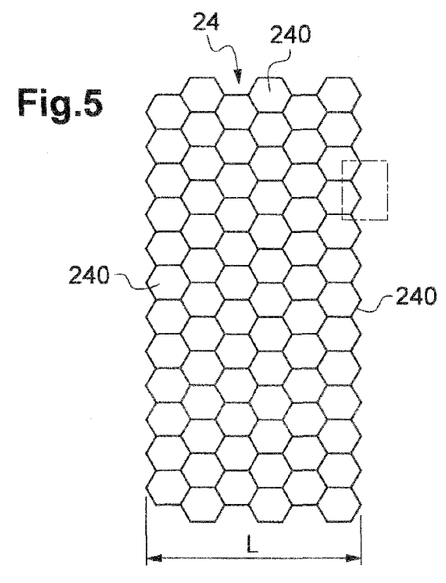
FIG. 5 is a top view of one embodiment of the honeycomb matrix structure of a sealing bead according to the invention.
Figure 5A:
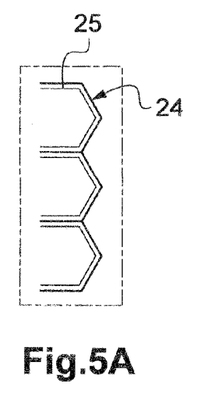
FIG. 5A is a view of a detail of FIG. 5 allowing the constitution of the walls of the honeycomb matrix alveoli according to the invention to be seen.

A bead 23 comprises a honeycomb matrix structure 24 made of polyurethane (PU) each of the two main faces of which is covered with a polyethylene (PE) sheet 25a, 25b. The walls of the alveoli 240 of the honeycomb are also covered with a coating 25 made of PE joining the sheets 25a, 25b made of PE (FIG. 4A).

To produce such a bead 23, the honeycomb matrix structure 24 made of PU may advantageously be produced by thermoforming or hot molding. Next, the internal coating 25 made of PE is molded on the walls of the alveoli 240 (FIG. 5A) and lastly, a sheet 25a, 25b made of PE is hot rolled onto each of the two main faces of the matrix 24. These sheets 25a, 25b and the internal coating 25 contribute to ensuring the seal tightness of the matrix structure 24 to the various metal current collectors 10, typically made of aluminum, of the stack of a bipolar battery (FIG. 4).

The width of each sealing bead 23 according to the invention corresponds substantially to that of the honeycomb matrix 24 and is advantageously comprised between 0.5 and 1 cm.

The height of each sealing bead 23 according to the invention corresponds substantially to that of the honeycomb matrix 24 plus those of the PE sheets 25a, 25b and is advantageously comprised between 100 and 200 μm and preferably equal to 150 μm.

With a honeycomb matrix structure 24, a sealing bead 23 according to the invention has many advantages, such as:
- a good mechanical strength ensuring a constant electrochemical compartment C1, C2 height substantially corresponding to the height of the PU honeycomb matrix structure 24 plus those of the PE sheets 25a, 25b;
- a propensity for the bipolar battery according to the invention to be more flexible than a battery according to the prior art in which a sealing joint has a solid structure;
- the sealing beads 23 weigh less compared to sealing joints according to the prior art;
- after being heated a number of times in succession, all the electrochemical compartments of the bipolar battery are guaranteed to be leak-tight; and
- the seal tightness is improved compared to those obtained in the prior art, because the many alveoli in themselves form multiple sealing airlocks between each electrochemical compartment and the exterior environment.

Steps for producing a bipolar battery integrating sealing means according to the invention with a honeycomb matrix based on PU or PTFE, covered or coated on each of its faces with a heat-sealing and electrically insulating material, are described below with reference to FIGS. 6A to 6J. The battery produced comprises two cells C1, C2 stacked one on top of the other and each comprising an anode, a cathode and an electrolyte. It is specified that all the substrates 10, 13, 21 are made of aluminum, all the anodes of $Li_4Ti_5O_{12}$ and all the cathodes of $LiFePO_4$. The separators are all made of the same material such as polyvinylidene fluoride (PVDF). The electrolyte used is, for example, a mixture of carbonate and a lithium salt $LiPF_6$.

It is specified that all the steps 1 to 6 are performed at ambient temperature.

Figure 6A:
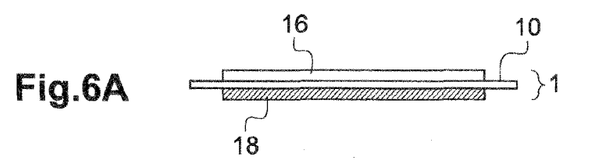

Step 1: a bipolar current collector 1 is produced with one face covered by the cathode 18 of the first cell C1 and the opposite face covered by the anode 16 of the second cell C2 (FIG. 6A).

Figures 6B, 6C:
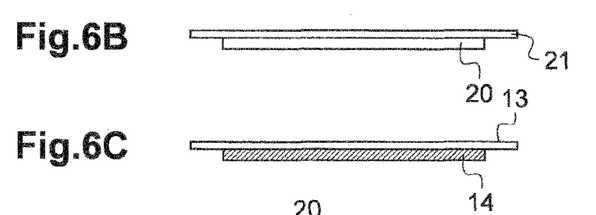

Step 2: a current collector 21 is produced with one face covered by the anode 20 of the first cell C1 (FIG. 6B).

Step 3: a terminal current collector 13 is produced with one face covered by the cathode 14 of the second cell C2 (FIG. 6C).

Figure 6D:
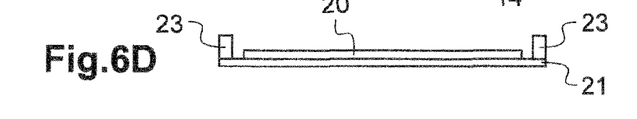

Step 4: A first bead 23 is produced comprising a honeycomb matrix 24 based on PU and, in the interior of its alveoli, PE and on each of its main faces a PE sheet 25a, 25b, as described above with reference to FIGS. 4A and 4B. Next, the first bead 23 with the honeycomb matrix 24 is deposited flat on the periphery of and making direct contact with that face of the collector which is covered with the anode 20 (FIG. 6D).

Figure 6E:
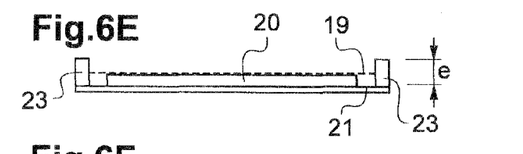

Step 5: A first separator 19 is intercalated by placing it on the anode 20 of the first terminal current collector 21 and in the interior of the first bead 23 (FIG. 6E).

Figures 6F, 6G, 6H, 6I, 6J, 7:
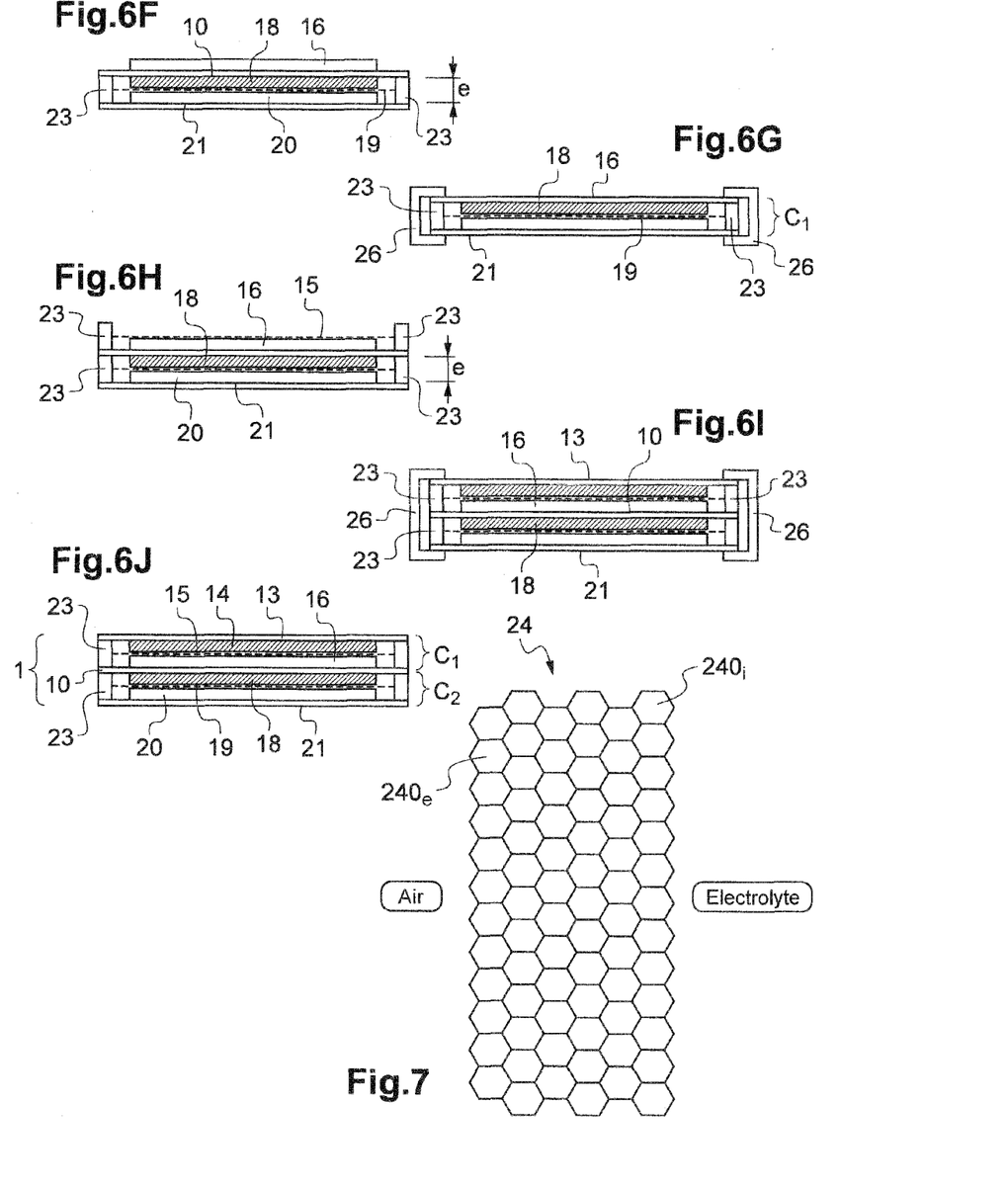

The bipolar current collector 1 is stacked on the first terminal collector 21 in such a way as to bring, on the one hand, the cathode 18 into direct contact with the first separator 19 and, on the other hand, the free face of the first bead 23 into direct contact with the periphery of the actual current collector 10 (FIG. 6F).

Step 6: Next, the first bead 23 is heated using U-shaped heating jaws 26 encircling the electrochemical cell C2 formed (FIG. 6G). This heating heat seals the sheets 25a, 25b of the first bead 23 to one of the faces of the bipolar collector 1 and of the terminal current collector 21.

Step 7: A step that is the same as the aforementioned step 4/ is carried out but with the bipolar collector 1. Thus, a second bead 23 is produced comprising a honeycomb matrix 24 based on PU and, in the interior of its alveoli, PE and on each of its main faces a PE sheet 25a, 25b, as described above with reference to FIGS. 4A and 4B. Next, the second bead 23 with the honeycomb matrix 24 is deposited flat on the periphery of and making direct contact with that face of the collector which is covered with the anode 16 of the bipolar collector.

Step 8: A second separator 15 is intercalated by placing it on the anode 16 of the bipolar collector 1 and in the interior of the second bead 23 (FIG. 6H).

The second terminal current collector 13 is stacked on the bipolar collector 1 in such a way as to bring, on the one hand, the cathode 14 into direct contact with the second separator 15 and, on the other hand, the free face of the second bead 23 into direct contact with the periphery of the terminal current collector 13 (FIG. 6I).

Step 9: Next, the periphery of the two-cell C1, C2 bipolar battery stack is heated using encircling U-shaped heating jaws 26 (FIG. 6J). This heating heat seals the sheets 25a, 25b of the second bead 23 to one of the faces of the bipolar collector and of the terminal current collector 13.

The seal thus obtained by all the beads 23 is thus perfect with respect to the electrolyte and this applies to all the cells C1, C2 of the bipolar battery.

With regard to the electrolytes, an electrolyte in polymer form or that solidifies at low temperature or in liquid form impregnated in a separator may be used. For activating the electrolytes, each separator 15, 19 may be impregnated with an electrolyte in gel form or in a form that solidifies at low temperature, before the integration of same during assembly. Alternatively, the assembly may be carried out with stacking of the whole battery, the seal produced according to the invention, then an entry made for the liquid electrolyte for subsequent filling via a pipe arranged between the two beads.

In order to further reinforce the seal of a bipolar battery produced with beads according to the invention, certain alveoli of the honeycomb structure of the beads may advantageously be filled with salts or mucilaginous compounds. Thus, as shown in FIG. 7, the interior alveoli 240i of a bead 23 matrix 24, which are those closest to the cells C1, C2, i.e. those making contact with the lithiated electrolyte of the cells, may advantageously be filled with salts or mucilaginous compounds apt to react with said electrolyte. The exterior alveoli 240e of a bead 23 matrix 24, which are those closest to the external environment, i.e. those making contact with the ambient air, may also advantageously be filled with salts or mucilaginous compounds apt to react with moisture in the air. By way of mucilaginous compounds, it may be a question of superabsorbent polymers such as sodium polyacrylates.

Instead of coating by hot rolling each main face of the honeycomb matrix 24, alternatively the latter may be coated with an epoxide or methacrylic resin before the deposition on a current collector and before the actual heat sealing step.

The invention is not limited to the examples that have just been described; features of the illustrated examples may in particular be combined together within variants not illustrated.

It goes without saying that while the seal according to the invention, using beads comprising honeycomb matrices based on PU or PE with coating sheets or layers made of a heat-sealing material, has been described in connection with a bipolar battery with two stacked cells, it may be implemented in the same way for a battery with a number n of stacked cells by repeating the preceding steps 1 to 9 with a number equal to n−2 of bipolar collectors and two terminal current collectors 13, 21.

The invention claimed is:

1. A bipolar Li-ion battery, including:
   at least a first and second electrochemical cells stacked one on top of the other and each comprising an anode, a cathode and an electrolyte,
   at least one bipolar current collector one face of which is covered by the anode made of lithium insertion material of the first cell and the opposite face is covered by the cathode made of lithium insertion material of the second cell, the bipolar collector comprising at the periphery thereof, on each of the faces thereof, at least one bead of an electrically insulating material forming a peripheral zone of a wall impermeable to the electrolyte of the first or second cells, surrounding same, at least one first current collector adjacent to the bipolar collector one face of which is covered by the cathode of the first cell; the first adjacent collector also comprising at the periphery thereof, at least one bead of an electrically insulating material also forming a peripheral zone of the wall impermeable to the electrolyte of the first cell, at least one second current collector adjacent to the bipolar collector one face of which is covered by the anode of the second cell; the second adjacent collector also comprising at the periphery thereof, at least one bead of an electrically insulating material also forming a peripheral zone of the wall impermeable to the electrolyte of the second cell, wherein each impermeable wall consists of at least one bead formed from a honeycomb matrix covered, on each of its two main faces, with a layer or sheet made of a heat-sealing and electrically insulating material, each layer or sheet being heat sealed to one of the current collectors, the heat-sealing and electrically insulating material at least partially filling the alveoli of the honeycomb in such a way that the two layers or sheets join together.

2. The bipolar battery as claimed in claim 1, each current collector being a substrate made of aluminum.

3. The bipolar battery as claimed in claim 1, the heat-sealing material being an epoxide resin or a methacrylate resin coated, before the installation on a current collector and the heat sealing, on the interior and on each of the two main faces of the honeycomb matrix.

4. The bipolar battery as claimed in claim 1, the heat-sealing material being one of polyethylene hot-molded in the interior of the honeycomb matrix and hot-rolled in the form of a sheet, before the installation on a current collector and the heat sealing, on each of the two main faces of the honeycomb matrix.

5. The bipolar battery as claimed in claim 1, the thickness of each bead being substantially equal to the thickness of an electrochemical cell.

6. The bipolar battery as claimed in claim 1, the thickness of each bead being between 100 and 200 µm, preferably equal to 150 µm plus or minus 5 µm.

7. The bipolar battery as claimed in claim 1, the width of each bead being between 0.1 and 2 cm.

8. The bipolar battery as claimed in claim 1, some of the alveoli of the honeycomb matrix, which are closest to the electrochemical cells, being filled with salts or mucilaginous compounds apt to react with the electrolyte.

9. The bipolar battery as claimed in claim 1, some of the alveoli of the honeycomb matrix, which are furthest from the electrochemical cells, being filled with salts or mucilaginous compounds apt to react with moisture in the ambient air.

10. The bipolar battery as claimed in claim 1, including a stack of n electrochemical cells, with a number of n-2 bipolar current collectors, one of the adjacent collectors being a terminal current collector, the other of the adjacent collectors being the other terminal current collector.

11. The bipolar battery as claimed in claim 1, the anodes are made of $Li_4Ti_5O_{12}$ and the cathodes of $LiFePO_4$.

12. A bipolar battery production process including least a first and second electrochemical cells stacked one on top of the other and each comprising an anode, a cathode and an electrolyte, comprising the following steps:

a/ producing a bipolar current collector with one face covered by the anode made of lithium insertion material of the first cell and the opposite face covered by the cathode made of lithium insertion material of the second cell;

b/ producing a first current collector, intended to be adjacent to the bipolar collector one face of which is covered by the cathode of the first cell;

c/ producing a second current collector, intended to be adjacent to the bipolar collector one face of which is covered by the anode of the second cell;

d/ producing a first bead formed from a honeycomb matrix, at least some of the alveoli of the matrix being filled with a heat-sealing and electrically insulating material that furthermore covers each of its two main faces taking the form of a layer or sheet;

e/ installing the bead on the periphery of that face of the second collector which is covered with the anode;

f/ installing a first separator on the anode of the second collector in the interior of the first bead;

g/ stacking the bipolar current collector such that the anode of the adjacent second collector is facing the cathode of the bipolar collector while being separated from the first separator, and such that the first sealing bead bears against both the second collector and the bipolar collector; and h/ heating the first bead making contact with the periphery of the collectors so as to heat seal the honeycomb matrix, steps d/ to h/ being carried out at least once with a second sealing bead, a second separator and the first current collector.

13. The process as claimed in claim 12, wherein the heating in each step f/ is carried out using U-shaped heating jaws placed about peripheral portions of the previously stacked collectors.

14. The process as claimed in claim 12, wherein the heating in each step f/ is carried out at a temperature below 200° C. and typically at about 80° C.

* * * * *